United States Patent
Religa et al.

(10) Patent No.: US 11,983,482 B2
(45) Date of Patent: May 14, 2024

(54) DOCUMENT CONVERSION ENGINE

(71) Applicant: Microsoft Technology Licensing, LLC, Redmond, WA (US)

(72) Inventors: Tomasz Lukasz Religa, Seattle, WA (US); Utsab Bose, Bellevue, WA (US); Si-Qing Chen, Bellevue, WA (US); Lei Cui, Beijing (CN); Tao Ge, Beijing (CN); Huitian Jiao, Redmond, WA (US); Ravi Mandliya, Seattle, WA (US); Kaushik Ramaiah Narayanan, Bellevue, WA (US); Max Wang, Seattle, WA (US); Furu Wei, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/011,792

(22) PCT Filed: May 20, 2021

(86) PCT No.: PCT/US2021/033474
§ 371 (c)(1),
(2) Date: Dec. 20, 2022

(87) PCT Pub. No.: WO2022/010579
PCT Pub. Date: Jan. 13, 2022

(65) Prior Publication Data
US 2023/0315969 A1 Oct. 5, 2023

(30) Foreign Application Priority Data
Jul. 10, 2020 (LU) .................................. LU101914

(51) Int. Cl.
*G06F 3/048* (2013.01)
*G06F 40/103* (2020.01)
(Continued)

(52) U.S. Cl.
CPC .......... *G06F 40/103* (2020.01); *G06F 40/186* (2020.01); *G06F 40/258* (2020.01); *G06N 20/00* (2019.01)

(58) Field of Classification Search
CPC .... G06F 40/103; G06F 40/258; G06F 40/186; G06N 20/00
See application file for complete search history.

(56) References Cited

U.S. PATENT DOCUMENTS 9,626,068 B2 * 4/2017 Maloney ............... G06F 40/131
10,025,464 B1 * 7/2018 Cooper ................. G06F 40/106
(Continued)

OTHER PUBLICATIONS

Dong, Li, "Microsoft /Unilm", Retrieved From: https://github.com/microsoft/unilm, Apr. 2, 2020, 11 Pages.

*Primary Examiner* — David Phantana-angkool
(74) *Attorney, Agent, or Firm* — Schwegman Lundberg & Woessner, P.A.

(57) ABSTRACT

A system and method for converting a document is described. The system accesses a document comprising one or more section breaks. The system detects sections of the text document demarked by the one or more section breaks and generates a section title metadata and a section summary metadata for each section of the plurality of sections. The system inserts the section title metadata and the section summary metadata at the corresponding section breaks in the text document. The system modifies the text document into slides. Each slide being formed for each section based on the corresponding section title metadata and the section summary metadata. The system generates a presentation document based on the slides.

15 Claims, 11 Drawing Sheets

(51) Int. Cl.
*G06F 40/186* (2020.01)
*G06F 40/258* (2020.01)
*G06N 20/00* (2019.01)

(56) References Cited

U.S. PATENT DOCUMENTS

| | | | |
|---|---|---|---|
| 10,627,997 B1* | 4/2020 | Cooper | G06F 3/0482 |
| 11,270,061 B2* | 3/2022 | Herzig | G06N 20/00 |
| 11,790,165 B2* | 10/2023 | Wilde | G06F 3/04842 |
| | | | 715/202 |
| 2017/0220535 A1* | 8/2017 | Olsen | G06F 40/117 |
| 2018/0181549 A1* | 6/2018 | Hileman | G06F 40/106 |
| 2018/0349449 A1* | 12/2018 | Lindley | G06F 16/483 |
| 2019/0179916 A1* | 6/2019 | Sivaji | G06F 16/34 |
| 2019/0394426 A1* | 12/2019 | Segal | H04N 21/42203 |
| 2020/0372077 A1 | 11/2020 | Religa et al. | |
| 2020/0380067 A1 | 12/2020 | Religa et al. | |
| 2022/0237374 A1* | 7/2022 | Wilde | G06F 3/04842 |
| 2022/0269713 A1* | 8/2022 | Wang | G06F 16/345 |

* cited by examiner

DOCUMENT CONVERSION ENGINE

CLAIM OF PRIORITY

This application is a U.S. National Stage Filing under 35 U.S.C. 371 of International Patent Application Serial No. PCT/US2021/033474, filed May 20, 2021, and published as WO 2022/010579 A1 on Jan. 13, 2022, which application claims the benefit of priority to Luxembourg Patent Application No. LU101914, filed Jul. 10, 2020, which applications and publication are incorporated herein by reference in their entirety.

TECHNICAL FIELD

The subject matter disclosed herein generally relates to a special-purpose machine that analyzes a document and modifies the document with document control items, including computerized variants of such special-purpose machines and improvements to such variants. Specifically, the present disclosure addresses systems and methods for using the document control items to facilitate conversion of the document to a different format.

BACKGROUND

A document editing application (e.g., Microsoft Word™) can be used to author and view a text document. However, some documents are unstructured and lack section breaks or headings. Document converters that convert the document from one format to another format are not able to process those types of unstructured documents.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
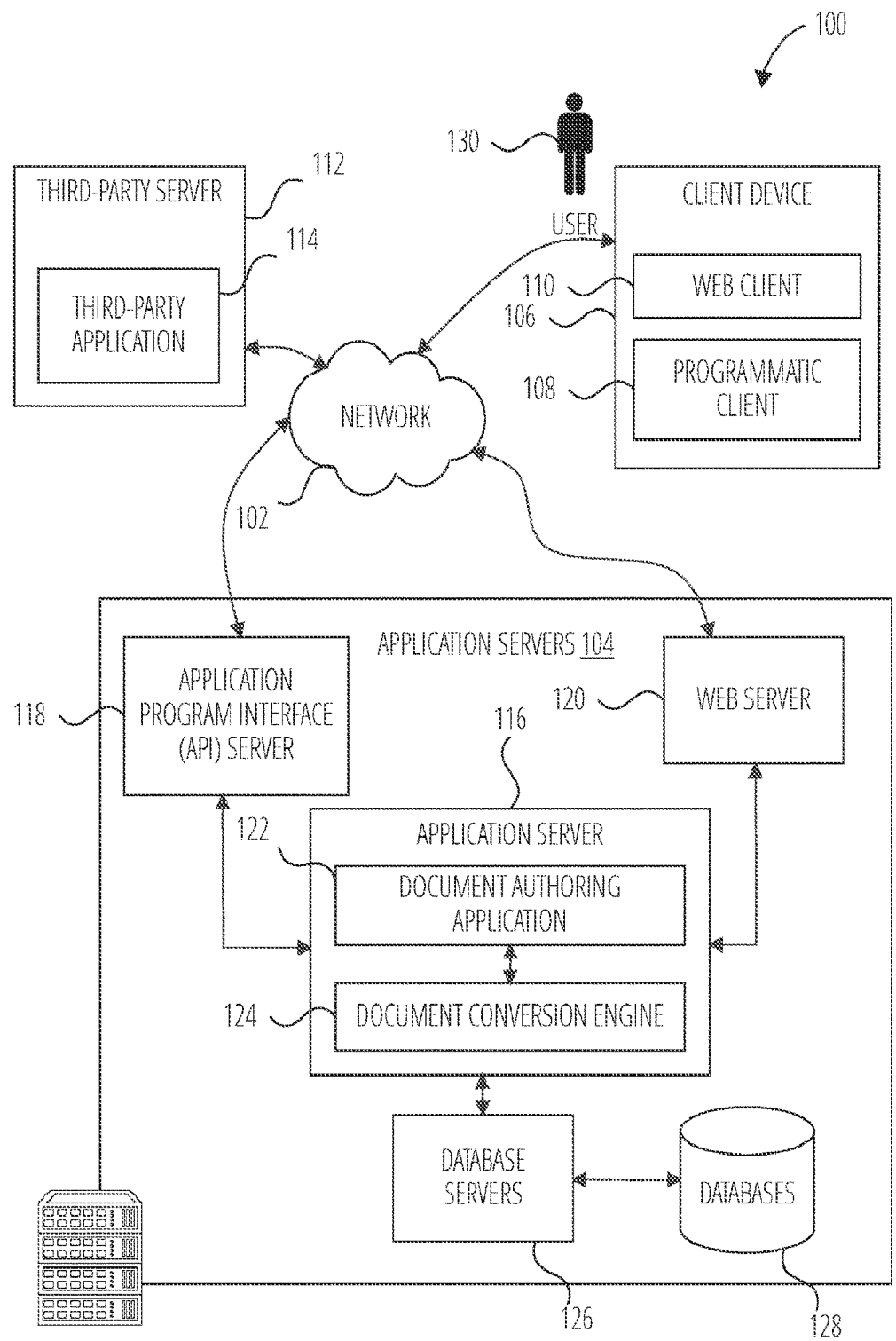
FIG. 1 is a diagrammatic representation of a networked environment in which the present disclosure is deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The term "document control item" is used herein to refer to an instruction embedded in a document and which is interpretable by a document viewing application in order to control one or more processes. One example of document control item is metadata embedded in the document. Non-limiting examples of processes which are controlled are: how the document is formatted, how portions of the documents are identified and organized, how portions of the documents are labeled, how portions of the documents are summarized, how portion of the documents are illustrated, how a renderer renders the document at a display, how the document is transmitted over a communications network, how the document is printed, and how the document is stored in a database.

The present application describes a system and method for analyzing an original document and modifying the document to generate a new document (e.g., presentation document) by detecting section breaks in the original documents, identifying or generating a label for each section, generating a summary for each section, and generating a slide for one or more label and corresponding summary. The original document includes a combination of text, images, diagrams, and tables. The original document may be formatted using a specific format corresponding to a document editing application (e.g., Microsoft Word™). In another example embodiment, the original document is formatted using other formats such as text, PDF, or HTML. The new document includes, for example, a slide document (e.g., also referred to as a slide deck) that contains presentation slides. The slide document may be formatted using a specific format corresponding to a presentation document editing application (e.g., Microsoft PowerPoint™). In another example embodiment, the new document may be formatted using the same format as the original document (e.g., Microsoft Word™) where each page of the new Word document includes a slide. In another example embodiment, the new document is formatted using other formats such as PDF where each page of the PDF document includes a slide. As such, the present system converts a first document formatted in a first format (e.g., Microsoft Word™) to a second document formatted in a second format (e.g., Microsoft PowerPoint™). In another example, the present system modifies the first document to generate the second document.

The present application describes a system that identify section breaks in the original document. The section breaks are: (1) explicitly indicated in the original document using labels with different heading styles; (2) determined using paragraph style determined by Machine Learning (ML) from the paragraph wording or font properties; or (3) determined using paragraph content determined using ML. The section breaks can include titles, logical demarcations provided by the document, determined independently by the algorithm, or include figures/tables captions.

In one example embodiment, the system demarks a section break at a location between portions of the document by inserting a document control item that breaks the document into logical portions. The document control item demarks content for each slide based on portions between the section breaks. Furthermore, the system generates a label (e.g., a section title) associated with a content of the portion of the text document. The label is associated with the document control item. As such, the system breaks down the text document into separated, logical sections and annotates labels (e.g., section titles) within the text document by inserting document control items.

The system then summarizes each section into key points. Such summarization can be extractive (e.g., find the most representative sentences) or abstractive (e.g., generate key points). The system then converts the titles and summaries into slides of a presentation document (e.g., the second document). The system uses a combination of a rule-based approach, pre-defined templates, or ML algorithms to convert the titles and summaries to the presentation document. The presentation document can also include tables, images, and image captions.

In one example embodiment, a system and method for converting a document is described. The system accesses a document comprising one or more breaks or section breaks. The system detects sections of the text document demarked by the one or more section breaks and generates a section title metadata and a section summary metadata for each section of the plurality of sections. The system inserts the section title metadata and the section summary metadata at the corresponding section breaks in the text document. The system modifies the text document into slides. Each slide being formed for each section based on the corresponding section title metadata and the section summary metadata. The system generates a presentation document based on the slides.

As a result, one or more of the methodologies described herein facilitate solving the technical problem of converting a document from a first format to a second format. As such, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 130 operates the client device 106. The client device 106 includes a web client 110 (e.g., a browser operating a web version of an enterprise application), a programmatic client 108 (e.g., a client-side enterprise document application such as Microsoft Word™ or Microsoft PowerPoint™) that is hosted and executed on the client device 106. In one example embodiment, the programmatic client 108 includes a document viewing/authoring application that renders an original document and a modified version of the document. For example, the document viewing/authoring application receives a request to access a document stored at the databases 128 or locally at the client device 106. The document includes several paragraphs with or without any headings or labels corresponding to the paragraphs. The document viewing/authoring application sends a request to the application servers 104 to convert the document into a modified version. The modified version includes a presentation document that includes slides based on the original document.

An Application Program Interface (API) server 118 and a web server 120 provide respective programmatic and web interfaces to application servers 104. A specific application server 116 hosts a document authoring application 122 and a document conversion engine 126. Both the document authoring application 122 and the document conversion engine 126 include components, modules and/or applications.

The document authoring application 122 includes a document authoring/editing application (e.g., Microsoft PowerPoint™, Microsoft Word™) that enables the user 130 to author, edit, and view content such as a presentation document formatted in a presentation format (Microsoft PowerPoint™), or a text document formatted in a text format (Microsoft Word™). In another example, the document authoring application 122 also includes a collaborative application that enables peer enterprise users to collaborate on a shared document. For example, the client device 106 may access the document authoring application 122 to view and edit a document that is shared with other peer users. Other examples of document authoring application 122 includes enterprise systems, content management systems, and knowledge management systems. The document authoring application 122 communicates with the programmatic client 108 on the client device 106. For example, the programmatic client 108 checks in with the document authoring application 122 and verifies a validity of a license or version of the programmatic client 108 on the client device 106. In another example embodiment, the programmatic client 108 includes at least one of a content creation application, a collaborative application, and a shared storage application.

The document conversion engine 126 accesses a document (also referred to as a text document, an original document, a first version of a document formatted in a first format) from the document authoring application 122, the database servers 124, the client device 106, or the third-party server 112. The original document includes paragraphs and headings. In another example, the original document includes unorganized paragraphs (e.g., paragraphs without document control items). The document conversion engine 126 modifies the original document into a new document (e.g., a presentation document formatted for a presentation application such as Microsoft PowerPoint™). In one example, the document conversion engine 126 identifies section breaks in the original document, identifies section/heading titles, generates summary of each section, and forms a slide for each section based on the corresponding section title and section summary.

In one example embodiment, the document conversion engine 126 identifies section breaks based on heading styles of content in the original document. For example, a heading may include a body title corresponding to a subsequent paragraph.

In one example embodiment, the document conversion engine 126 trains a machine learning model based on features of documents from a library of training documents stored in databases 128. The features may include paragraph keywords (e.g., "In conclusion", "Furthermore") or font properties (e.g., Italic, Bold, Underline, Color, Indentation, Font size) of the paragraphs in the training documents. The document conversion engine 126 uses the machine learning model to classify a section as whether to demark a section break.

In one example embodiment, the document conversion engine 126 trains a machine learning model based on features of documents from a library of training documents stored in databases 128. The features may include keywords and labels preceding paragraphs in the training documents. The document conversion engine 126 uses the machine learning model to classify a section as whether to demark a section break. The document conversion engine 126 also uses the machine learning model to identify a label that describes the paragraph(s) associated with the section break.

In one example embodiment, the document conversion engine 126 generates a document control item that identifies the section breaks and the label corresponding to a section. For example, the document control item includes metadata that identify the section breaks and label(s) in the text document. For example, the metadata include a section break attribute that identifies a location of a section break in the text document, and a label attribute that identifies a label associated with the section break. A value of the label attribute is based on the content of the paragraph immediately after the section break. The document control item includes a location marker within the text document to allow the user to directly navigate to a section (corresponding to the location marker) of the text document by identifying the location marker corresponding to a selected label. Other examples of document control items include a location pin, position marker, a place marker, a hidden user interface element, a paragraph identifier, or any other location identifiers inserted in the text document. For example, the location identifiers may be defined in a property (e.g., metadata) of the text document. The document control item may be visible or hidden to a user of the document authoring application 122.

In one example embodiment, the document conversion engine 126 trains a machine learning model based on features of documents from a library of training documents stored in databases 128. The features may include keywords of paragraphs in the training documents. The document conversion engine 126 uses the machine learning model to find the most representative sentences or to generate key points.

In one example embodiment, the document conversion engine 126 combines the slides for each section to form a presentation document using a presentation template. The document conversion engine 126 selects a presentation template from a library of presentation templates based on the summary title and summary of each section. In one example, the document conversion engine 126 uses a rule-based approach to identify a presentation template (e.g., template that includes tables based on tables in the original document) or using a machine learning model to identify a template based on the content of the summary sections.

In one example embodiment, the web client 110 communicates with the document conversion engine 126 and document authoring application 122 via the programmatic interface provided by the Application Program Interface (API) server 118. In another example embodiment, the document conversion engine 126 modifies a document or generates a new document and provides the modified/new document to the document authoring application 122 or the client device 106. The document authoring application 122 or the programmatic client 108 renders a display of the modified document in one or more panes of a user interface of the document authoring application 122 or programmatic client 108. For example, the document authoring application 122 renders a slide from the present document.

The application server 116 is shown to be communicatively coupled to database servers 124 that facilitates access to an information storage repository or databases 128. In one example embodiment, the databases 128 includes storage devices that store documents to be processed by the document authoring application 122. For example, the databases 128 include a library of documents (e.g., training text documents, modified documents, documents that are shared with the user 130, documents that are shared by the user 130, documents that are accessed, authored, or edited by the user 130 using the web client 110, the programmatic client 108, or the document authoring application 122).

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party. For example, the third-party application 114 retrieves a document and provides the document to the document conversion engine 126. The document conversion engine 126 modifies the document and provides the modified text document to the client device 106.

Figure 2:
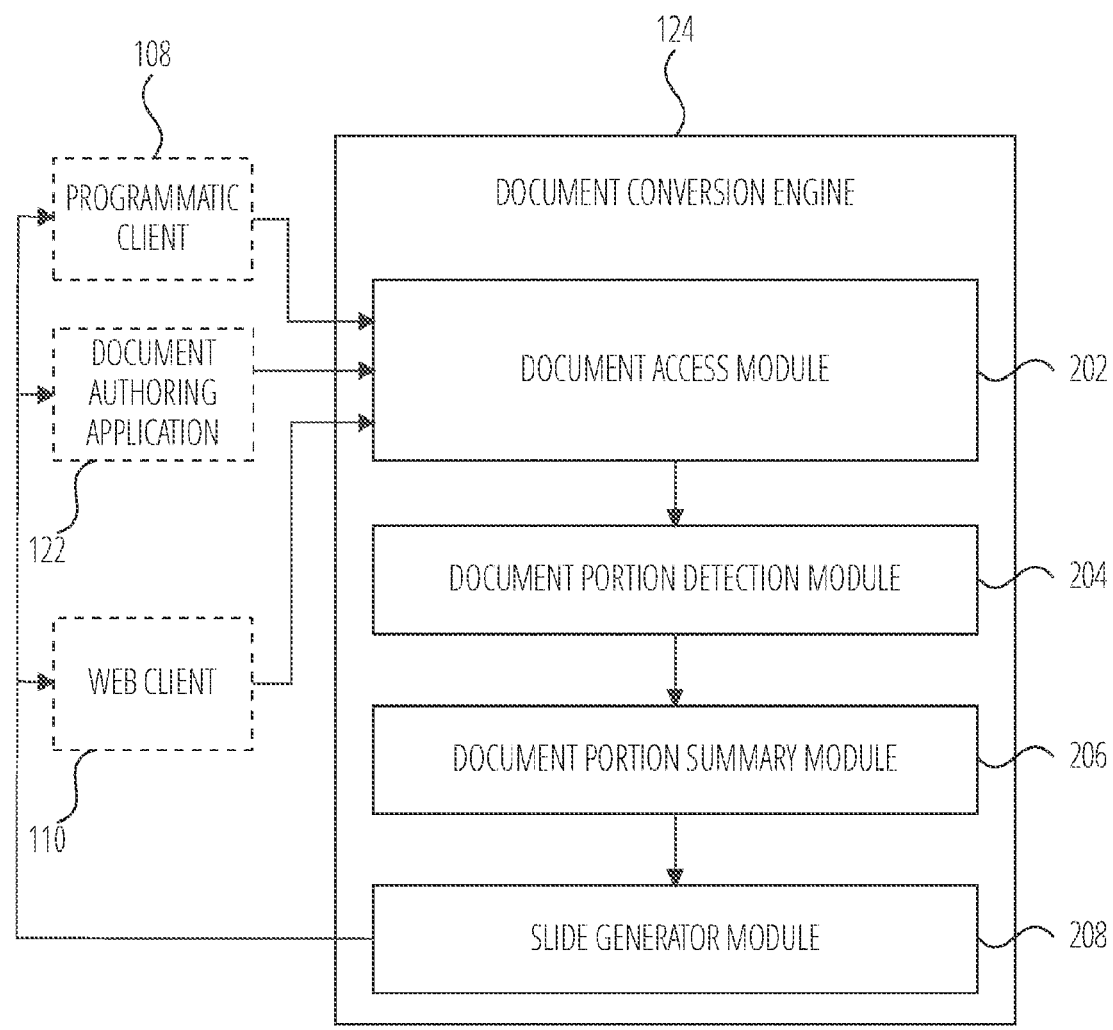
FIG. 2 is a block diagram illustrating a document conversion engine in accordance with one example embodiment.

FIG. 2 is a block diagram illustrating a document conversion engine 126 in accordance with one example embodiment. The document conversion engine 126 includes a document access module 202, a document portion detection module 204, a document portion summary module 206, and a slide generator module 208.

The document access module 202 retrieves a document (in a first format) accessed by the programmatic client 108, the document authoring application 122, or the web client 110. In another example, the document access module 202 accesses the document stored in the databases 128 or at the client device 106. In another example, the document access module 202 detects that a document is being accessed/viewed/edited by the programmatic client 108, document authoring application 122, or the web client 110. In response to the detection, the document access module 202 accesses the document that is being accessed/viewed/edited and provides the document to the document portion detection module 204.

The document portion detection module 204 detects and identifies section breaks in the document. In one example embodiment, the document portion detection module 204 identifies section breaks and section titles in the document based on explicitly identified metadata in the document (e.g., "Title", <title>). In other examples, the document portion detection module 204 uses machine learning to identify section breaks based on the content in the document. The document portion detection module 204 is described in more detail below with respect to FIG. 3.

The document portion summary module 206 generates/identifies a section title and generates a summary of the paragraph/content identified by the section breaks. The section name or title may be based on the explicitly identified title metadata in the document using the document portion detection module 204. The document portion summary module 206 uses machine learning to generate a summary of the paragraph. The summary may include a multi-sentence summary or a one-sentence summary. The document portion summary module 206 is described in more detail below with respect to FIG. 4.

The slide generator module 208 converts each section into a slide using a presentation template from a list of templates based on factors such as whether the original document includes an image, a graph, bullet points. In one embodiment, the slide generator module 208 uses a rule-based approach to identify a presentation template for the modified document based on the previous factors. In another example embodiment, the slide generator module 208 uses machine learning to identify a presentation template for the modified document based on the content in the section summary and section title. The slide generator module 208 generates a presentation document based on the slides and the presentation template. The slide generator module 208 communicates the presentation document to the document authoring application 122 or the client device 106. The slide generator module 208 is described in more detail below with respect to FIG. 5. The presentation document may be formatted in a format for use with a presentation application (e.g., Microsoft PowerPoint™), or other formats such as a PDF format where each page corresponds to a slide.

Figure 3:
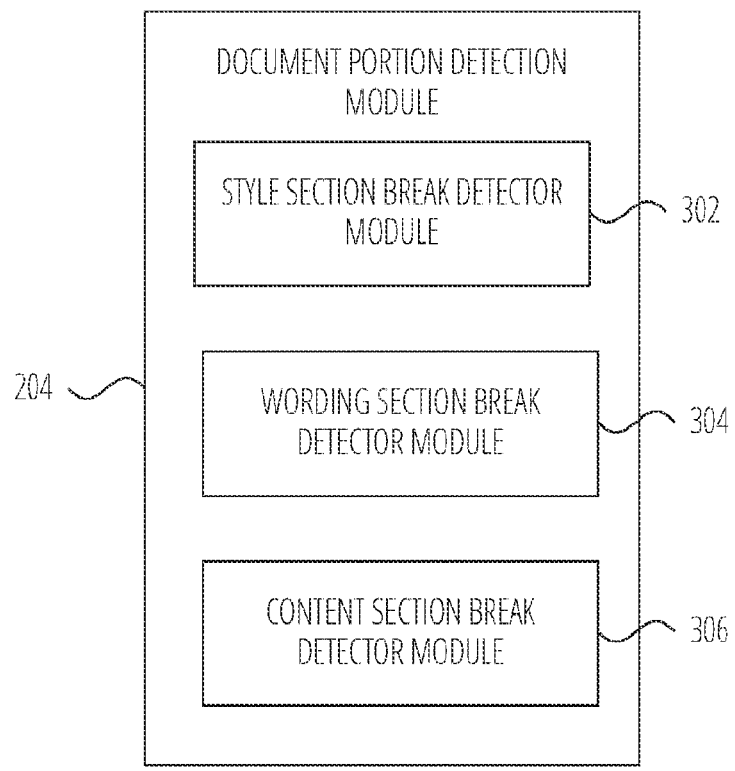
FIG. 3 illustrates a document portion detection module in accordance with one example embodiment.

FIG. 3 illustrates a document portion detection module 204 in accordance with one example embodiment. The document portion detection module 204 includes a style section break detector module 302, a wording section break detector module 304, and a content section break detector module 306.

The style section break detector module 302 detects and identifies section breaks in the document based on the paragraph styles. For example, the document includes explicit section breaks that are identified using for example different heading styles in the document. Examples of heading styles include "Title", "Heading 1", "Heading 2" that denote section breaks and the titles of each section. The style section break detector module 302 detects and identifies the heading styles to identify section breaks, titles, and the paragraphs. In another example, for documents in an HTML format, the document portion detection module 204 detects the tags (e.g., <title>, <h1>, <h2> or <h3>) to identify the section breaks and titles.

In one example embodiment, the wording section break detector module 304 uses a machine learning model to identify section titles and section breaks from wording in the paragraphs. For example, terms such as "In summary," "in conclusion" typically identify the beginning of a new thought and likely a section break. In another example, the wording section break detector module 304 uses a machine learning model to identify font properties used in the paragraphs of the document. For example, a font with larger size typically indicates a title or a paragraph heading.

In another example embodiment, the wording section break detector module 304 uses a machine learning model to identify section titles and section breaks from content in the paragraphs (when font properties are not available). The content section break detector module 306 uses a machine learning model to infer whether a given paragraph denotes section title, and consequently, start of new section. The machine learning model can be trained based on text of the paragraph of interest as well as paragraphs before and after to derive explicit labelling. In another example, the document portion summary module 206 detects headings where the user has modified font properties (e.g. larger, bold, different color) and infer from the user action to derive and identify section titles and section breaks.

In one example, when the document is a continuous stream of text, the content section break detector module 306 identifies and detects section breaks and titles using a machine learning model trained using a supervised machine learning. The content section break detector module 306 derives both section breaks and their titles by using information from the paragraphs before and after the intended section break. The content section break detector module 306 is described in more detail below with respect to FIG. 6.

Figure 4:
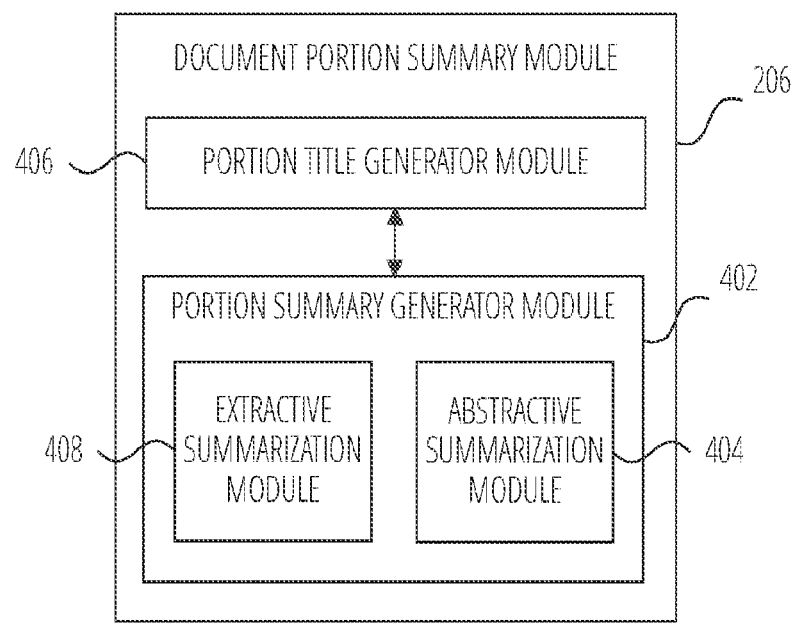
FIG. 4 illustrates a document portion summary module in accordance with one example embodiment.

FIG. 4 illustrates a document portion summary module 206 in accordance with one example embodiment. The document portion summary module 206 comprises a portion summary generator module 402, and a portion title generator module 406.

The portion title generator module 406 identifies the title of a section using the title metadata or indicator from the document. For example, the portion title generator module 406 retrieves the title of a section from the title identified by a "Title" metadata heading in the document.

The portion summary generator module 402 summarizes the section content. In one example, the portion summary generator module 402 includes an extractive summarization module 408 and an abstractive summarization module 404. The extractive summarization module 408 trains a machine learning model to identify the most representative sentences of a paragraph. The extractive summarization module 408 uses the machine learning model to identify the most representative sentences from the section content.

The abstractive summarization module 404 trains a machine learning model to generate key points of a paragraph. For example, the abstractive summarization module 404 trains two abstractive summarization models: one model generates a multi-sentence summary and the other model generates a one-sentence summary. Both models can be trained on public news datasets.

Figure 5:
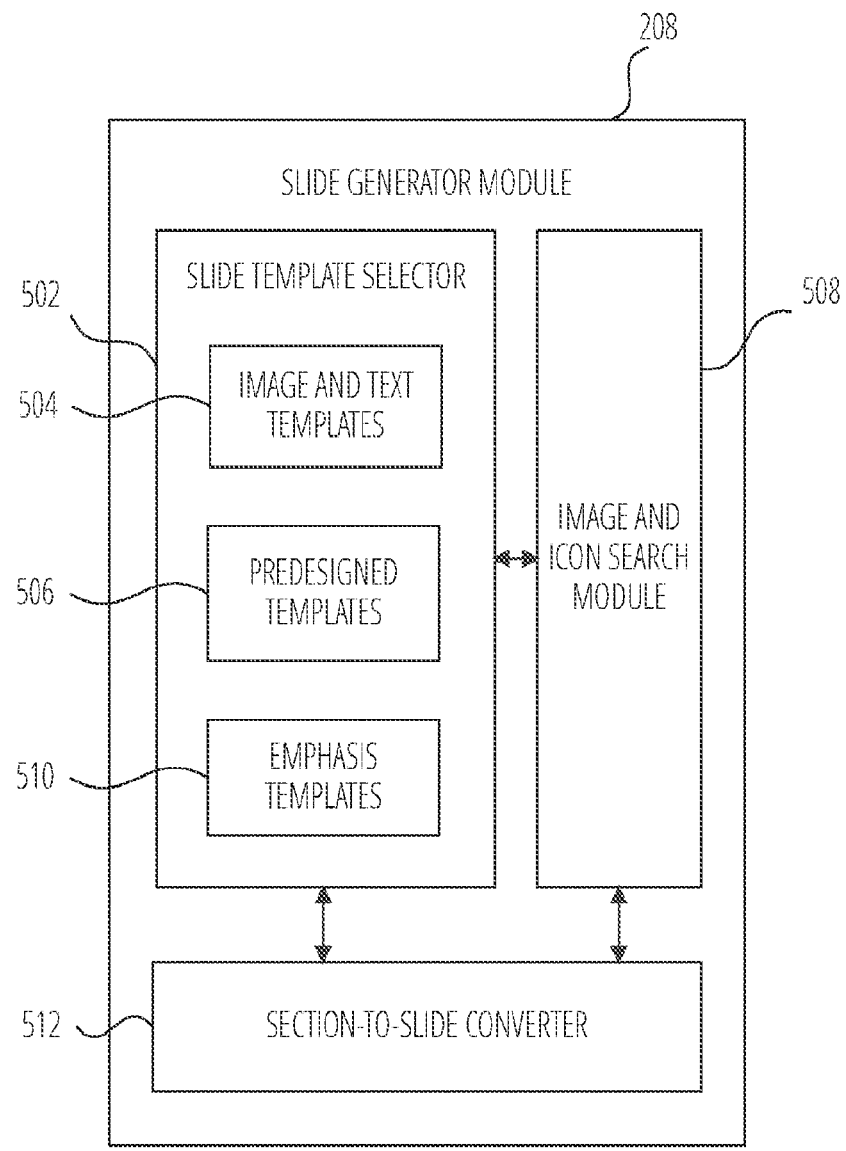
FIG. 5 illustrates a slide generator module in accordance with one example embodiment.

FIG. 5 illustrates a slide generator module 208 in accordance with one example embodiment. The slide generator module 208 comprises a slide template selector 502, an image and icon search module 504, and a section-to-slide converter 512.

The slide generator module 208 converts each section into a slides using a rule-based approach to initially define the appropriate slide layout and decide on the subsequent steps. For example, the slide template selector 502 selects a presentation template based on the title layout (for the first slide, deck title), section layout (if heading 1 was followed by lower level headings), and the content layout.

The slide template selector 502 selects a design for the summarized content slides from a list of templates based on factors such as if an image from the original document corresponds with the slide, the number of bullet points provided by the summarizer, and the length of these bullet points. The main content templates includes image and text templates 506, predesigned templates 508, and emphasis templates 510.

The image and text templates 506 includes presentation templates that display a relevant image alongside the content. The slide template selector 502 selects this presentation template if an image in the original document corresponds with the slide, or if bullet points are of substantial length. If the template is selected and there is no image in the corresponding document, the image and text templates 506 uses the algorithm from the image and icon search module 504 to find a corresponding image.

The predesigned templates 508 includes presentation templates of bullet and icon "SmartArt" templates. For example, these presentation templates include attaching an icon to a bullet point. The predesigned templates 508 selects a timeline SmartArt template if the slide template selector 502 detects a chronological ordering of time (e.g., years) in the content summary. The emphasis templates 510 include full screen image/chart templates when "important" images are identified in the document. The important image may be identified by metadata in the document. The emphasis templates 510 also include table templates that are used to display tables from the original document.

The image and icon search module 504 operates the following algorithm to find relevant images and icons for a block of text. To find an image for a corresponding block of text, the image and icon search module 504 creates a histogram of all unigrams, bigrams, and trigrams in the block of text. To find the "most interesting" block of text, the image and icon search module 504 ranks the n_grams with the following formula:

$$\text{count of } n\_gram \text{ in text} \times \log(\text{percentage of } n\_gram \text{ in corpus})_{count\ of\ n\_gram\ to\ corpus > X}$$

Where X is a number chosen to filter out very uncommon phrases that likely do not have an image.

The image and icon search module 504 uses an image provider (e.g., image search engine) to obtain a relevant image for the phrase.

A similar process is used to obtain icons, except:
Only unigrams are used to build the model.
Either: 'X' is a much larger number, or a whitelist is used to ensure that the "most interesting" word corresponds to a valid icon
The image search provider is replaced with an icon search provider.

The section-to-slide converter 512 combines the generated slides from the slide template selector 502 with the images and icon from the image and icon search module 504 into a presentation document. The presentation document may be formatted to be operated with a presentation application (e.g., Microsoft PowerPoint™) or in another format (e.g., PDF).

Figure 6:
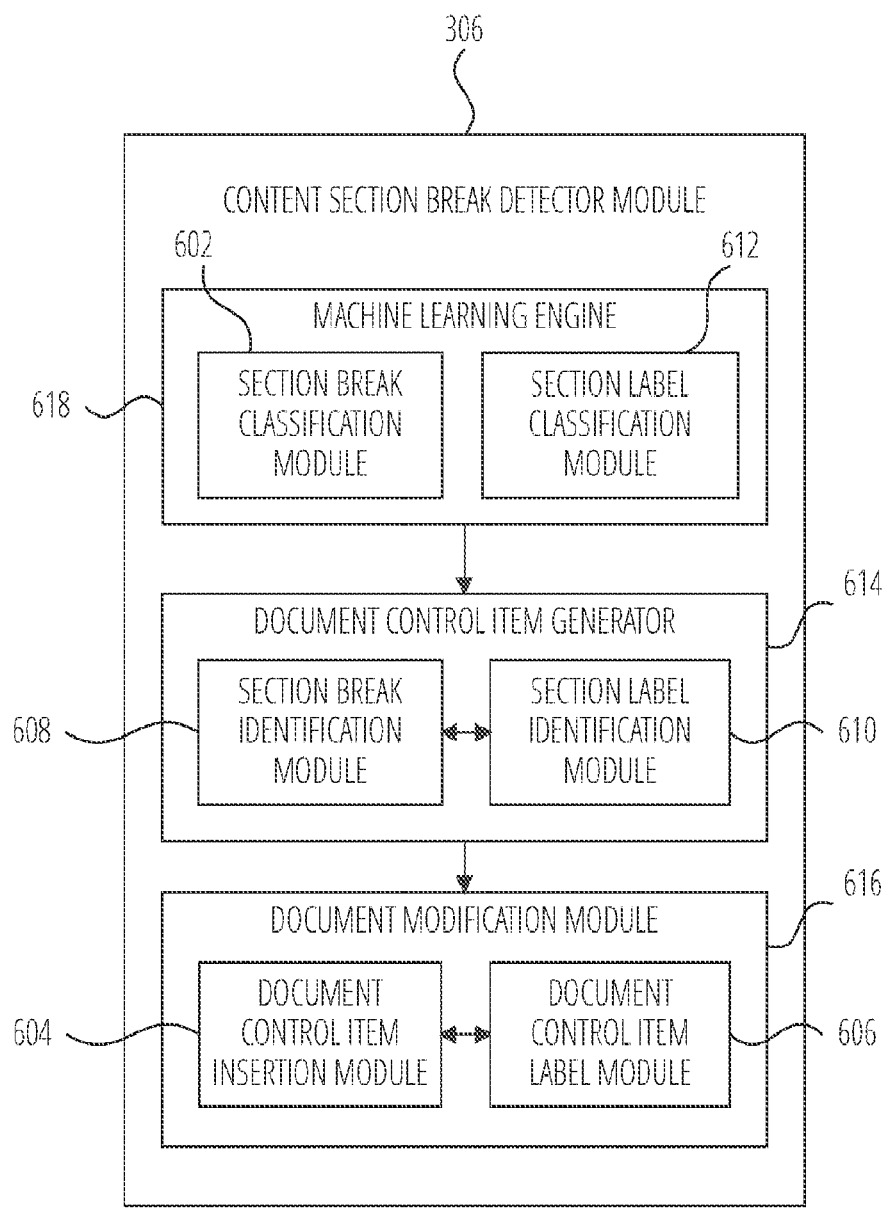
FIG. 6 is a block diagram illustrating a content section break detector module in accordance with one example embodiment.

FIG. 6 is a block diagram illustrating a content section break detector module in accordance with one example embodiment. The content section break detector module 306 comprises a section break classification module 606, a document control item insertion module 614, a document control item label module 618, a section break identification module 612, a section label identification module 616, a section label classification module 608, a document control item generator 610, a document modification module 602, and a machine learning engine 604.

The machine learning engine 604 operates using pattern detection algorithms and trained Machine Learning (ML) models to identify section boundaries and corresponding section titles in the text document. For example, the machine learning engine 604 includes a trained machine learning model that receives the portion of the text document, analyzes the portion of the text document, and generates a classification of the portion as demarking a section break (or not). The machine learning engine 604 receives a portion that includes two paragraphs (e.g., one paragraph immediately following another paragraph) from the text document. The machine learning engine 604 uses the trained machine learning model to determine whether to demark a section break between the two paragraphs in the text document.

In another example embodiment, the machine learning engine 604 includes a section break classification module 606 and a section label classification module 608. The section break classification module 606 includes a trained machine learning model (also referred to as "section boundary" model) that determines a beginning of new section within the document. The section label classification module 608 includes a trained machine learning model that predicts a label for a title of the section (also referred to as "section title" model).

In one example embodiment, for both models (e.g., "section boundary" and "section title"), the machine learning engine 604 trains a deep neural network (DNN) with the following layers: Embedding→(Convolutional, MaxPooling)×2→Dropout→Dense→Dense. In the "section boundary" model, the output of the section break classification module 606 is a binary classifier that determines the probability that a new section starts (e.g., demarking a section break). In the "section title" model, the output of the section label classification module 608 is a multi-class classifier that determines one of the top 1000 possible titles (based on the training data). In another example embodiment, other alternative implementation of the section break classification module 606 include rule-based approaches, unsupervised machine learning or other supervised machine learning methods (e.g., decision trees, support vector machines). Alternative embodiments of the section label classification module 608 for the "section title" model include using modified versions of language generation models, such as Bi-directional encoder representations (BERT) or Generative Pretrained Transformer 2 (GPT-2).

In one example embodiment, the DNN is trained based on a publicly available content (e.g., public library of text documents) retrieved from the internet. For example, the machine learning engine 604 processes the publicly available content and outputs text in each paragraph excluding the heading paragraphs. Then, the machine learning engine 604 trains the "section boundary" model on whether a heading was available in the original dataset. The "section title" model is similarly trained on the text content of the locations in a multi-class approach. In one example, to improve the quality of the predictions, the machine learning engine 604 uses text information from five paragraphs before and five paragraphs after the location of interest. As such, to predict whether a section title is needed at a particular location (for the "section boundary" model), the machine learning engine 604 uses text from paragraphs N−5, N−4, N−3, N−2, N−1, N+0, N+1, N+2, N+3, N+4. For the "section title" model, the machine learning engine 604 identifies for keywords used in the same paragraph.

In another example embodiment, the machine learning engine 604 trains the "section boundary" model using actual text document datasets where the headings (which are either explicitly or implicitly mentioned) are removed. Moreover, the machine learning engine 604 obtains training data for supervised learning from other public databases (e.g. newspaper databases, legal document databases, research article databases). In another example, the machine learning engine 604 train the "section boundary" model directly from user input collected from the document authoring application 122. In other examples, the machine learning engine 604 trains personalized models by using user-specific documents (e.g., documents authored or viewed by the user 130).

In another example embodiment, if the "section boundary" model is unable to classify a section to demark with the section breaks with high enough confidence, the section break classification module 606 creates section breaks every fixed number of paragraphs or divides the text document into a fixed number of sections. Similarly, in case the "section title" model is unable to predict a label (e.g., section title) with high confidence, the section label classification module 608 uses the section's first sentence as its summary or use unsupervised learning to determine the most representative word, phrase or sentence from the section. The results of the both models is used to suggest to the user 130, a location of such section titles or their content.

In one example embodiment, the results of the model prediction from section break classification module 606 and section label classification module 608 are served by a REST call at the document conversion engine 126 of the application server 116. In another example, the "section boundary" model and the "section title" model are stored on the client device 106.

The document control item generator 610 generates a document control item that identifies a section break and a label (e.g., section title) associated with the paragraph immediately following the section break. For example, the document control item includes metadata that identifies the section breaks and label(s) in the text document. The metadata may include a section break attribute that identifies a location of a section break in the text document, and a label attribute that identifies a label associated with the section break. A value of the label attribute is based on the content of the paragraph immediately after the section break.

In one example embodiment, the document control item generator 610 includes a section break identification module 612 and a section label identification module 616. The section break identification module 612 identifies a section break and generates a value for the section break attribute of the metadata. The value indicates a location (e.g., between paragraph x and paragraph x+1) of the section break in the text document.

In another example embodiment, the document control item generator 610 includes a link feature that identifies a location of a section associated with a label. For example, when the user selects the label (displayed in a user interface that lists all the labels of the text document), the document control item generator 610 identifies the location of the section associated with the selected label and causes the document authoring application 122 to navigate to the location and display the section in a graphical user interface.

In another example, the section break identification module 612 generates a document control item that includes a location marker within the text document to allow the user to directly navigate to a section (corresponding to the location marker) of the text document by identifying the location marker corresponding to a selected label. Other examples of document control items include a location pin, position marker, a place marker, a hidden user interface element, a paragraph identifier, or any other location identifiers inserted in the text document. For example, the location identifiers may be defined in a property (e.g., metadata) of the text document.

The section label identification module 616 generates a label (e.g., a header title, a paragraph heading) for one or more paragraph immediately preceding the section break. For example, the section label identification module 616 generates a value for the label attribute of the metadata. The value of the label attribute includes one or more keywords or a paragraph title that is based on the content of the paragraph(s) immediately after the section break.

The document modification module 602 modifies the text document by inserting/embedding the document control item(s) in the text document. In one example embodiment, the document modification module 602 includes a document control item insertion module 614 and a document control item label module 618. The document control item insertion module 614 modifies metadata of the text document by including a section break attribute that identifies a location of a section break in the text document. The document control item label module 618 modifies metadata of the text document by including a label attribute that identifies a label associated with the section break (or associated with the paragraph(s) following the section break). In one example, the document modification module 602 replaces a content of the text document with the modified text document (e.g., original text document modified with added sections breaks and added section labels/paragraph titles). In another example, the document modification module 602 retains the original content of the text document but only modifies metadata of the text document. In another example, the document modification module 602 modifies the content of the text document and modifies the metadata of the text document.

The document modification module 602 stores the modified text document in the databases 128. The document modification module 602 communicates the modified text document to the document portion summary module 206 for further processing.

Figure 7:
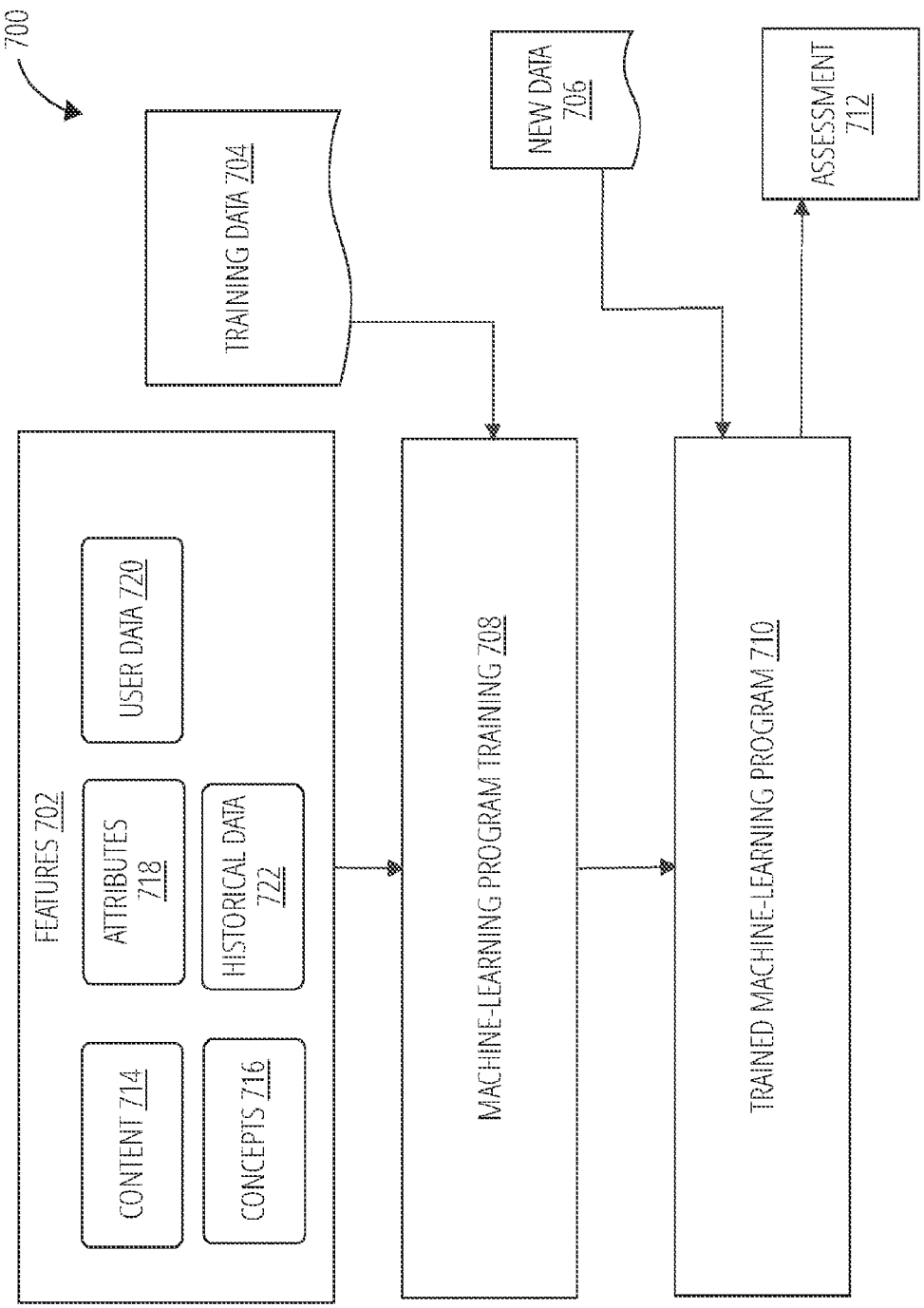
FIG. 7 illustrates training and use of a machine-learning program, according to some example embodiments.

FIG. 7 illustrates training and use of a machine-learning program 700, according to some example embodiments. In some example embodiments, machine-learning programs (MLPs), also referred to as machine-learning algorithms or tools, are used to perform operations associated with searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 704 (e.g., text documents that include paragraph labels/titles/headings) in order to make data-driven predictions or decisions expressed as outputs or assessments (e.g., assessment 712—such as whether to demark a section break between two paragraphs and identify a label that is indicative of content in one or more paragraphs immediately following the section break). Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring section breaks and keywords.

Two common types of problems in machine learning are classification problems and regression problems. Classification problems, also referred to as categorization problems, aim at classifying items into one of several category values (for example, demark as section break or not demark as section break). Regression algorithms aim at quantifying some items (for example, by providing a value that is a real number).

The machine-learning algorithms use features 702 for analyzing the data to generate an assessment 712. Each of the features 702 is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example embodiment, the features 702 may be of different types and may include one or more of content 714 (e.g., common words used in two or more consecutive paragraphs), concepts 716 (e.g., keywords), attributes 718, historical data 720 and/or user data 722 (e.g., user-style such as "in conclusion"), merely for example.

The machine-learning algorithms use the training data 704 to find correlations among the identified features 702 that affect the outcome or assessment 712. In some example embodiments, the training data 704 includes labeled data, which is known data for one or more identified features 702 and one or more outcomes, such as detecting communication patterns, detecting the meaning of a portion of a text document, generating a summary of the portion of the text document, detecting action items in messages detecting urgency in the message, detecting a relationship of the user to the sender, calculating score attributes, calculating message scores, identifying keywords, etc.

With the training data 704 and the identified features 702, the machine-learning tool is trained at machine-learning program training 706. The machine-learning tool appraises the value of the features 702 as they correlate to the training data 704. The result of the training is the trained machine-learning program 710.

In one example embodiment, for both models (e.g., "section boundary" and "section title"), the machine-learning program training 706 trains a deep neural network (DNN) with the following layers: Embedding→(Convolutional, MaxPooling)×2→Dropout→Dense→Dense. In the "section boundary" model, the output of the trained machine-learning program 710 is a binary classifier that determines the probability that a new section starts (e.g., demarking a section break). In the "section title" model, the output of the trained machine-learning program 710 is a multi-class classifier that determines one of the top 1000 possible titles or labels.

In another example embodiment, other alternative implementation of the machine-learning program training 706 include rule-based approaches, unsupervised learning or other supervised machine learning methods (e.g., decision trees, support vector machines). Alternative embodiments of the machine-learning program training 706 for the "section title" model include using language generation models, such as BERT or GPT-2.

When the trained machine-learning program 710 is used to perform an assessment, new data 708 (e.g., text document without one or more paragraph headings) is provided as an input to the trained machine-learning program 710, and the trained machine-learning program 710 generates the assessment 712 (e.g., section break, and section label) as output.

Figure 8:
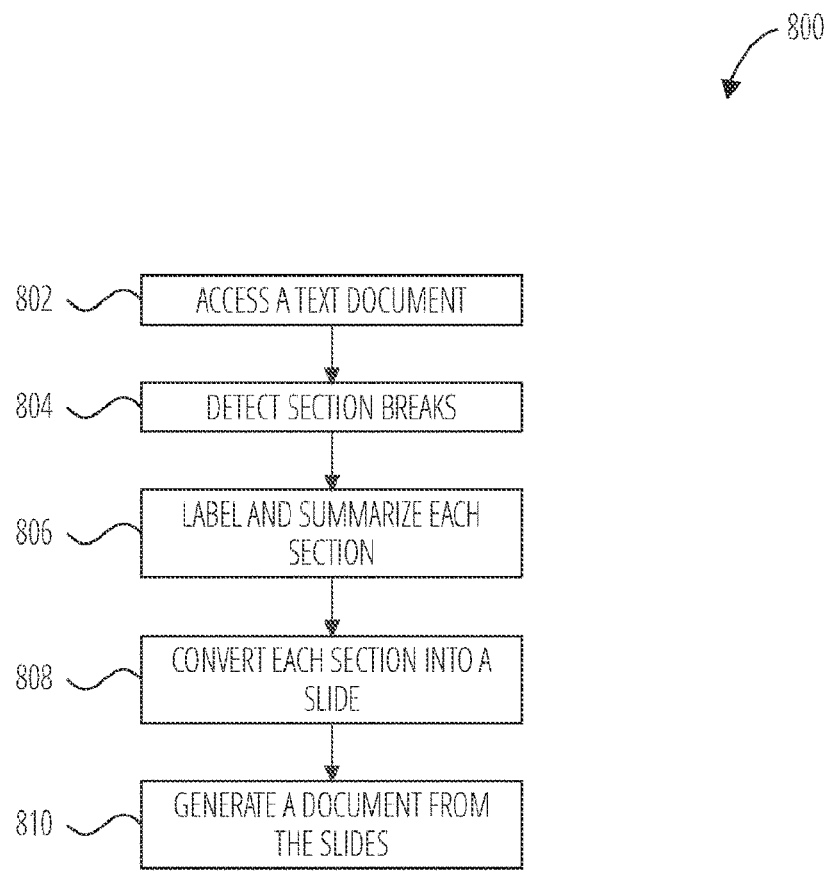
FIG. 8 is a flow diagram illustrating a method for modifying a document in accordance with one example embodiment.

FIG. 8 is a flow diagram illustrating a method for modifying a document in accordance with one example embodiment. Operations in the method 800 may be performed by the document conversion engine 126, using components (e.g., modules, engines) described above with respect to FIG. 6. Accordingly, the method 800 is described by way of example with reference to the document conversion engine 126. However, it shall be appreciated that at least some of the operations of the method 800 may be deployed on various other hardware configurations or be performed by similar components residing elsewhere. For example, some of the operations may be performed at the client device 106.

At block 802, the document access module 202 accesses a text document (e.g., a "text" document may include images, tables, graphs). At block 804, the document portion detection module 204 detects section breaks in the document. At block 806, the document portion summary module 206 generates a title and a summary for each section. At block 808, the slide generator module 208 converts each section into a slide. At block 810, the slide generator module 208 generates a presentation document from the slides.

Figure 9:
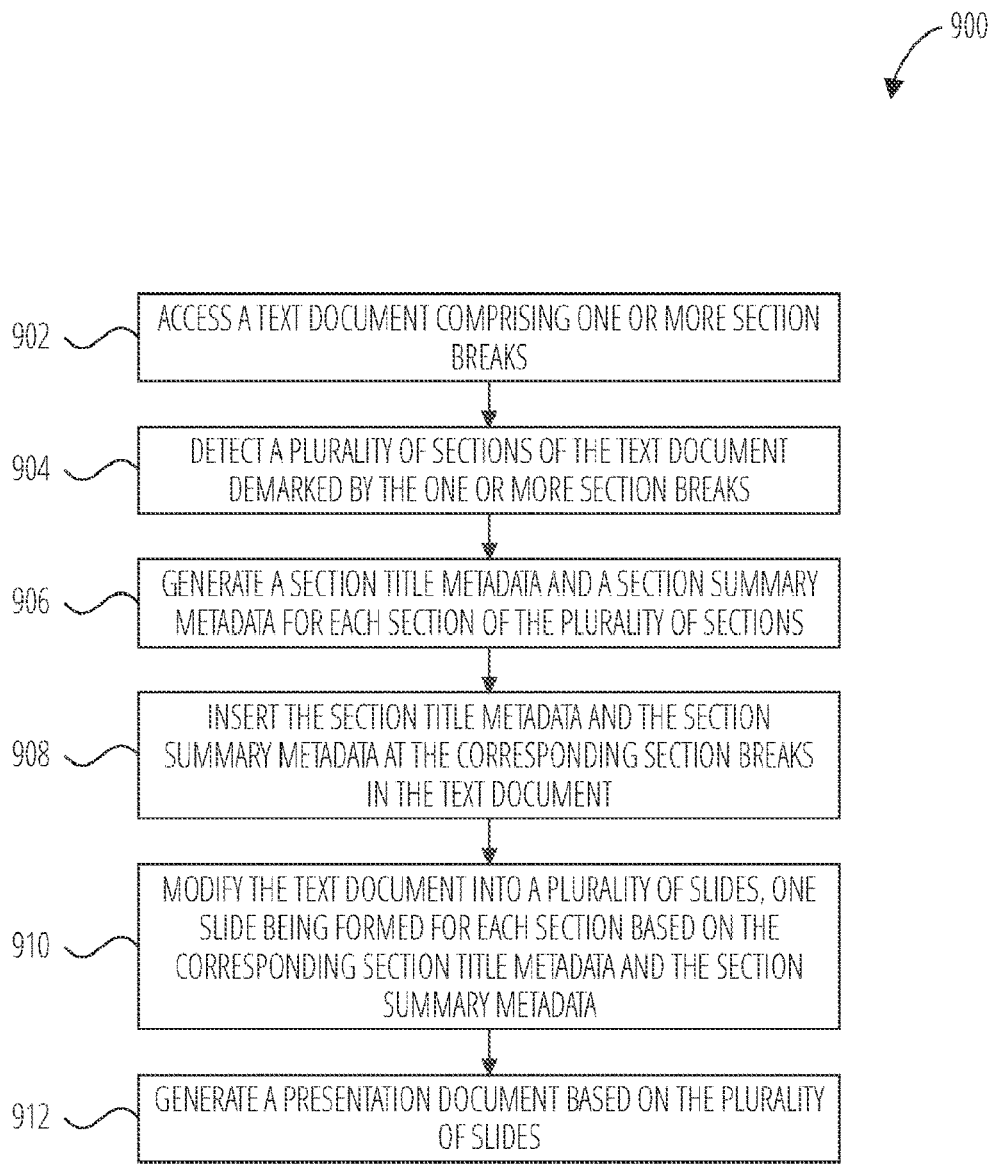
FIG. 9 illustrates a method for generating a presentation document in accordance with one example embodiment.

FIG. 9 illustrates a method for generating a presentation document in accordance with one example embodiment.

In block 902, routine 900 accesses a text document comprising one or more section breaks. In block 904, routine 900 detects a plurality of sections of the text document demarked by the one or more section breaks. In block 906, routine 900 generates a section title metadata and a section summary metadata for each section of the plurality of sections. In block 908, routine 900 inserts the section title metadata and the section summary metadata at the corresponding section breaks in the text document. In block 910, routine 900 modifies the text document into a plurality of slides, one slide being formed for each section based on the corresponding section title metadata and the section summary metadata. In block 912, routine 900 generates a presentation document based on the plurality of slides.

Figure 10:
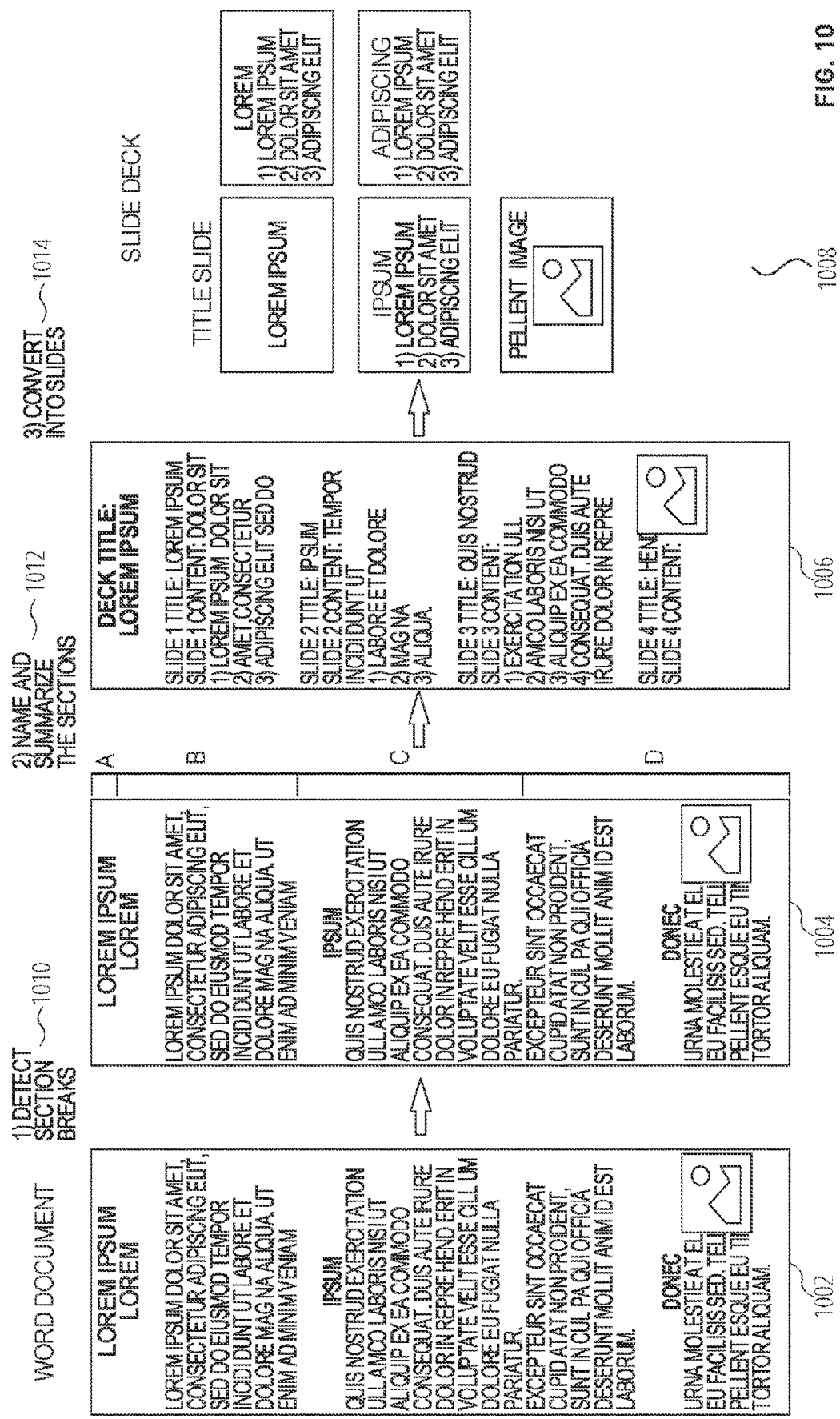
FIG. 10 is a diagram illustrating an example process for converting a document into a slide document in accordance with one example embodiment.

FIG. 10 is a conversion process 1000 illustrating an example of modifying a text document in accordance with one example embodiment. The document access module 202 accesses an original document 1002 in a first format (e.g., Microsoft Word™). The document portion detection module 204 performs a section break detection process 1010 on the original document 1002 to detect section breaks. The document portion summary module 206 performs a section break summarization process 1012 on the modified document with section breaks 1004 to generate section titles and section summary. The slide generator module 208 performs a slide conversion process 1014 on the modified document with section label and section summary 1006 to generate slides document 1008.

Figure 11:
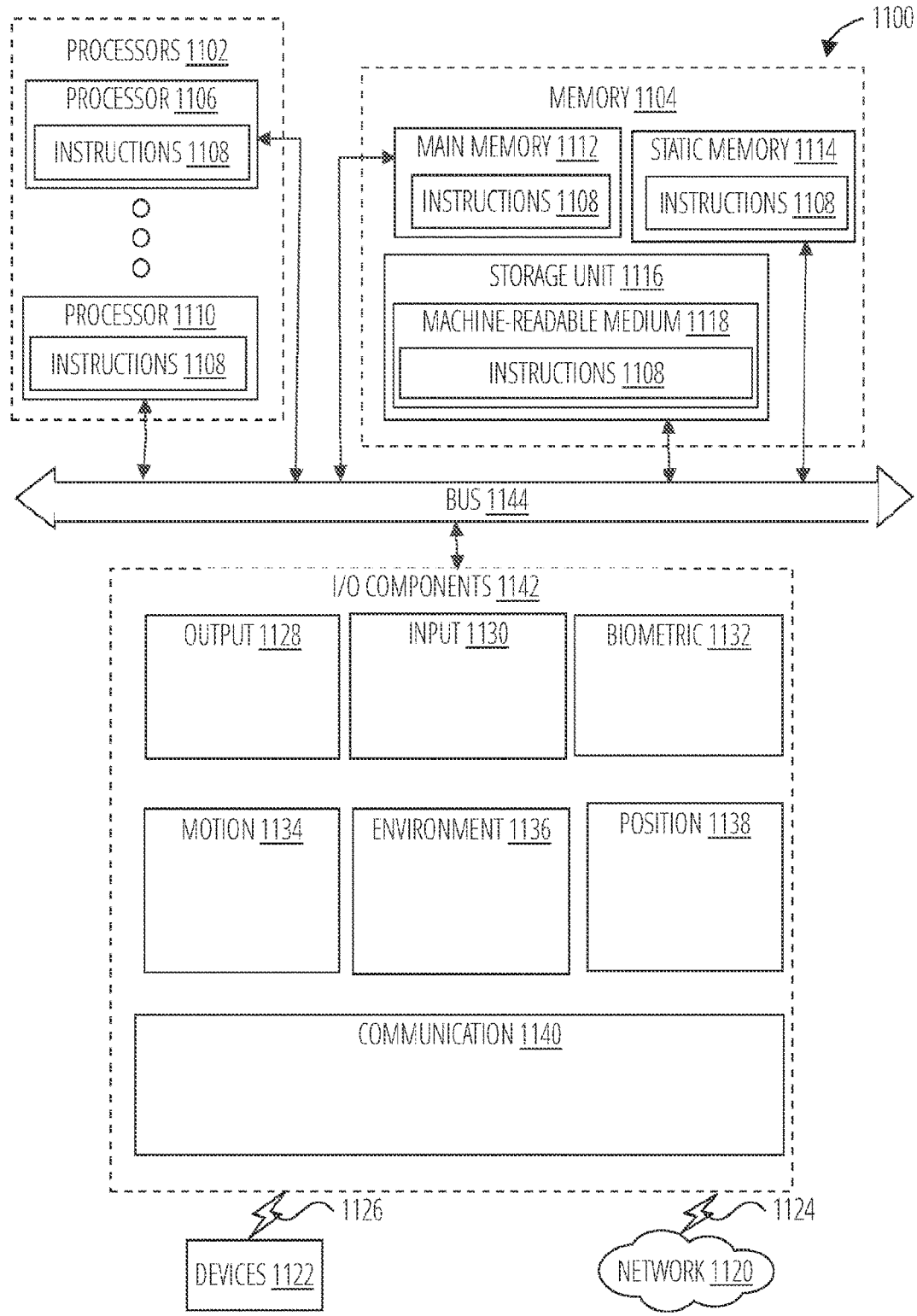
FIG. 11 is a diagrammatic representation of a machine in the form of a computer system within which a set of instructions may be executed for causing the machine to perform any one or more of the methodologies discussed herein, according to an example embodiment.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include processors 1102, memory 1104, and I/O components 1142, which may be configured to communicate with each other via a bus 1144. In an example embodiment, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1106 and a Processor 1110 that execute the instructions 1108. The term "Processor" is intended to include multi-core processors that may comprise two or more independent processors (sometimes referred to as "cores") that may execute instructions contemporaneously. Although FIG. 11 shows multiple processors 1102, the machine 1100 may include a single Processor with a single core, a single Processor with multiple cores (e.g., a multi-core Processor), multiple processors with a single core, multiple processors with multiples cores, or any combination thereof.

The memory 1104 includes a main memory 1112, a static memory 1114, and a storage unit 1116, both accessible to the processors 1102 via the bus 1144. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the Processor's cache memory), or any suitable combination thereof, during execution thereof by the machine 1100.

The I/O components 1142 may include a wide variety of components to receive input, provide output, produce output, transmit information, exchange information, capture measurements, and so on. The specific I/O components 1142 that are included in a particular machine will depend on the type of machine. For example, portable machines such as mobile phones may include a touch input device or other such input mechanisms, while a headless server machine will likely not include such a touch input device. It will be appreciated that the I/O components 1142 may include many other components that are not shown in FIG. 11. In various example embodiments, the I/O components 1142 may include output components 1128 and input components 1130. The output components 1128 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1130 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1142 may include biometric components 1132, motion components 1134, environmental components 1136, or position components 1138, among a wide array of other components. For example, the biometric components 1132 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 include acceleration sensor components (e.g., accelerometer), gravitation sensor components, rotation sensor components (e.g., gyroscope), and so forth. The environmental components 1136 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 1142 further include communication components 1140 operable to couple the machine 1100 to a network 1120 or devices 1122 via a coupling 1124 and a coupling 1126, respectively. For example, the communication components 1140 may include a network interface Component or another suitable device to interface with the network 1120. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi® signal triangulation, location via detecting an NFC beacon signal that may indicate a particular location, and so forth.

The various memories (e.g., memory 1104, main memory 1112, static memory 1114, and/or memory of the processors 1102) and/or storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed embodiments.

The instructions 1108 may be transmitted or received over the network 1120, using a transmission medium, via a network interface device (e.g., a network interface Component included in the communication components 1140) and using any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: accessing a text document comprising one or more section breaks; detecting a plurality of sections of the text document demarked by the one or more section breaks: generating a section title metadata and a section summary metadata for each section of the plurality of sections; inserting the section title metadata and the section summary metadata at the corresponding section breaks in the text document: modifying the text document into a plurality of slides, one slide being formed for each section based on the corresponding section title metadata and the section summary metadata: and generating a presentation document based on the plurality of slides.

Example 2 includes example 1, wherein the text document comprises a plurality of heading metadata, each heading metadata indicating a corresponding section of the text document, wherein the section title metadata is based on the heading metadata corresponding to the section, wherein the section summary metadata is based on a text of the section identified by the heading metadata.

Example 3 includes any of the above examples, wherein detecting the plurality of sections further comprises: detecting a plurality of heading style metadata in the text document; and identifying the plurality of sections based on the plurality of heading style metadata.

Example 4 includes any of the above examples, wherein detecting the plurality of sections further comprises: identifying one or more consecutive paragraphs in the text document; determining, using a machine learning model, that the one or more consecutive paragraphs are part of a same section; and assigning the one or more consecutive paragraphs to the same section.

Example 5 includes any of the above examples, wherein the machine learning model is configured to identify at least one of a paragraph wording, a font property of text in the section, or a paragraph content.

Example 6 includes any of the above examples, wherein detecting the plurality of sections further comprises: identifying one or more consecutive paragraphs of the text document; determining font properties of the one or more consecutive paragraphs: and assigning the one or more consecutive paragraphs to the same section based on the font properties.

Example 7 includes any of the above examples, wherein generating the section title metadata and the section summary metadata further comprises, training a machine learning model using a training data set comprising a summary version dataset and a full content version dataset; forming, by applying the machine learning model to the section, a summary text that represents content of the section; and assigning the summary text to the section summary metadata.

Example 8 includes any of the above examples, wherein the summary text comprises a one-sentence summary or a multi-sentence summary.

Example 9 includes any of the above examples, further comprising: forming a layout of the slide based on the section title metadata and the section summary metadata.

Example 10 includes any of the above examples, further comprising: forming a title layout of the slide based on the section title metadata in the section; forming a section layout of the slide based on heading metadata in the section; and forming a content layout of the slide based on a slide template, wherein the slide template is selected from one of an image and text template, an icon template, and an emphasized content template based on detecting an image in the section, detecting a bullet point format in the summary text, or detecting a length of bullet points in the summary text.

Example 11 includes any of the above examples, further comprising: identifying a keyword in the summary text of a section; searching for an image corresponding to the keyword; and including the image in the slide corresponding to the section.

Example 12 includes any of the above examples, wherein the icon template comprises a bullet icon template or a timeline template, the bullet icon template comprising a layout of an icon being displayed adjacent to a bullet point of the summary text, the timeline template comprising a layout of an icon depicting a chronological sequence based on the summary text.

Example 13 includes any of the above examples, further comprising: generating a plurality of layouts of one slide based on the section title metadata and the section summary metadata; receiving a user-selection of one of the layout from the plurality of layouts; and generating the presentation document with the user-selected layout.

Example 14 is a computer-readable storage medium, the computer-readable storage medium including instructions that when executed by a computer, cause the computer to perform operations implementing the method of any of the above examples.

Example 15 is a computing apparatus comprising: a Processor; and a memory storing instructions that, when executed by the Processor, configure the apparatus to perform operations comprising: accessing a text document comprising one or more section breaks; detecting a plurality of sections of the text document demarked by the one or more section breaks: generating a section title metadata and a section summary metadata for a section of the plurality of sections; forming a slide for the section based on the section title metadata and the section summary metadata; and generating a presentation document comprising the slide.

What is claimed is:

1. A computer-implemented method comprising:
   accessing a text document comprising one or more section breaks;
   detecting a plurality of sections of the text document demarked by a combination of the one or more section breaks and a section identifier that is based on a machine learning model that detects a section of the text document based on content in the section, the section comprising a first paragraph from a first section demarked by a first section break and a second paragraph from a second section demarked by a second section break;
   generating a section title metadata and a section summary metadata for each section of the plurality of sections;
   inserting the section title metadata and the section summary metadata at the corresponding section breaks in the text document;
   modifying the text document into a plurality of slides, one slide being formed for each section based on the corresponding section title metadata and the section summary metadata; and
   generating a presentation document based on the plurality of slides.

2. The computer-implemented method of claim 1, wherein the text document comprises a plurality of heading metadata, each heading metadata indicating a corresponding section of the text document,
   wherein the section title metadata is based on the heading metadata corresponding to the section,
   wherein the section summary metadata is based on a text of the section identified by the heading metadata.

3. The computer-implemented method of claim 1, wherein detecting the plurality of sections further comprises:
   detecting a plurality of heading style metadata in the text document; and
   identifying the plurality of sections based on the plurality of heading style metadata.

4. The computer-implemented method of claim 1, wherein detecting the plurality of sections further comprises:
   identifying one or more consecutive paragraphs in the text document;
   determining, using the machine learning model, that the one or more consecutive paragraphs are part of a same section; and
   assigning the one or more consecutive paragraphs to the same section.

5. The computer-implemented method of claim 4, wherein the machine learning model is configured to identify at least one of a paragraph wording, a font property of text in the section, or a paragraph content.

6. The computer-implemented method of claim 4, wherein detecting the plurality of sections further comprises:
   identifying one or more consecutive paragraphs of the text document;
   determining font properties of the one or more consecutive paragraphs; and
   assigning the one or more consecutive paragraphs to the same section based on the font properties.

7. The computer-implemented method of claim 1, wherein generating the section title metadata and the section summary metadata further comprises:
   training the machine learning model using a training data set comprising a summary version dataset and a full content version dataset;
   forming, by applying the machine learning model to the section, a summary text that represents content of the section; and
   assigning the summary text to the section summary metadata.

8. The computer-implemented method of claim 1, wherein the summary text comprises a one-sentence summary or a multi-sentence summary.

9. The computer-implemented method of claim 1, further comprising:
   forming a layout of the slide based on the section title metadata and the section summary metadata.

10. The computer-implemented method of claim 9, further comprising:
    forming a title layout of the slide based on the section title metadata in the section;
    forming a section layout of the slide based on heading metadata in the section; and
    forming a content layout of the slide based on a slide template, wherein the slide template is selected from one of an image and text template, an icon template, and an emphasized content template based on detecting an image in the section, detecting a bullet point format in the summary text, or detecting a length of bullet points in the summary text.

11. The computer-implemented method of claim 9, further comprising:
    identifying a keyword in the summary text of a section;
    searching for an image corresponding to the keyword; and
    including the image in the slide corresponding to the section.

12. The computer-implemented method of claim 10, wherein the icon template comprises a bullet icon template or a timeline template, the bullet icon template comprising a layout of an icon being displayed adjacent to a bullet point of the summary text, the timeline template comprising a layout of an icon depicting a chronological sequence based on the summary text.

13. The computer-implemented method of claim 1 further comprising:
   generating a plurality of layouts of one slide based on the section title metadata and the section summary metadata;
   receiving a user-selection of one of the layout from the plurality of layouts; and
   generating the presentation document with the user-selected layout.

14. A non-transitory computer-readable storage medium, the computer-readable storage medium including instructions that when executed by a computer, cause the computer to perform operations implementing the method of claim 1.

15. A computing apparatus, the computing apparatus comprising:
   a processor; and
   a memory storing instructions that, when executed by the processor, configure the apparatus to perform operations comprising:
   accessing a text document comprising one or more section breaks;
   detecting a plurality of sections of the text document demarked by a combination of the one or more section breaks and a section identifier that is based on a machine learning model that detects a section of the text document based on content in the section, the section comprising a first paragraph from a first section demarked by a first section break and a second paragraph from a second section demarked by a second section break;
   generating a section title metadata and a section summary metadata for a section of the plurality of sections;
   forming a slide for the section based on the section title metadata and the section summary metadata; and
   generating a presentation document comprising the slide.

* * * * *